May 18, 1954  H. JACOBS  2,678,530
EXHAUST MANIFOLD, PARTICULARLY FOR TURBO CHARGING
Filed May 8, 1947  3 Sheets-Sheet 3
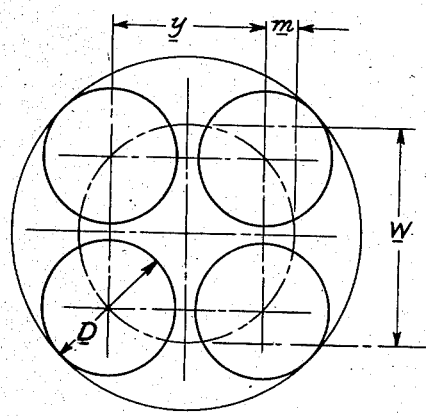
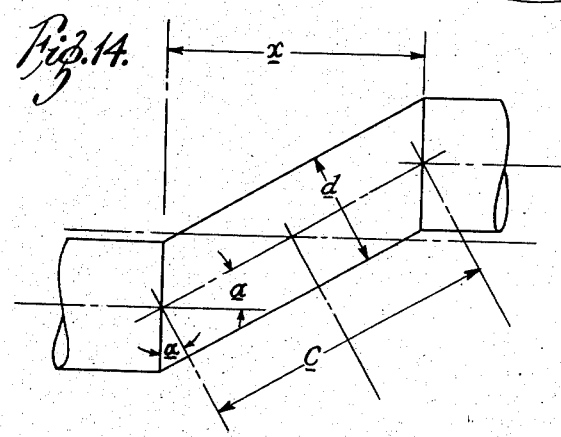
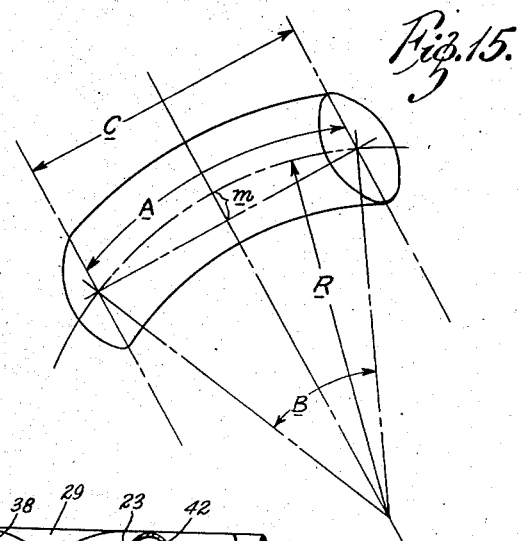
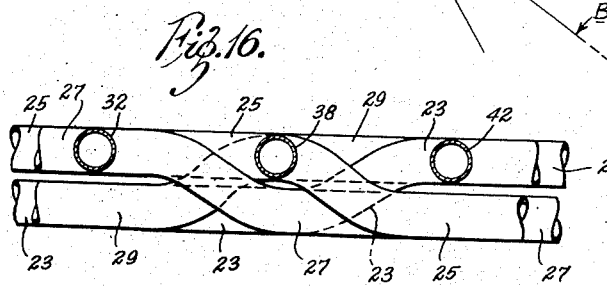
INVENTOR:
HAROLD JACOBS,
BY Kingsland Rogers & Ezell
ATTORNEYS.

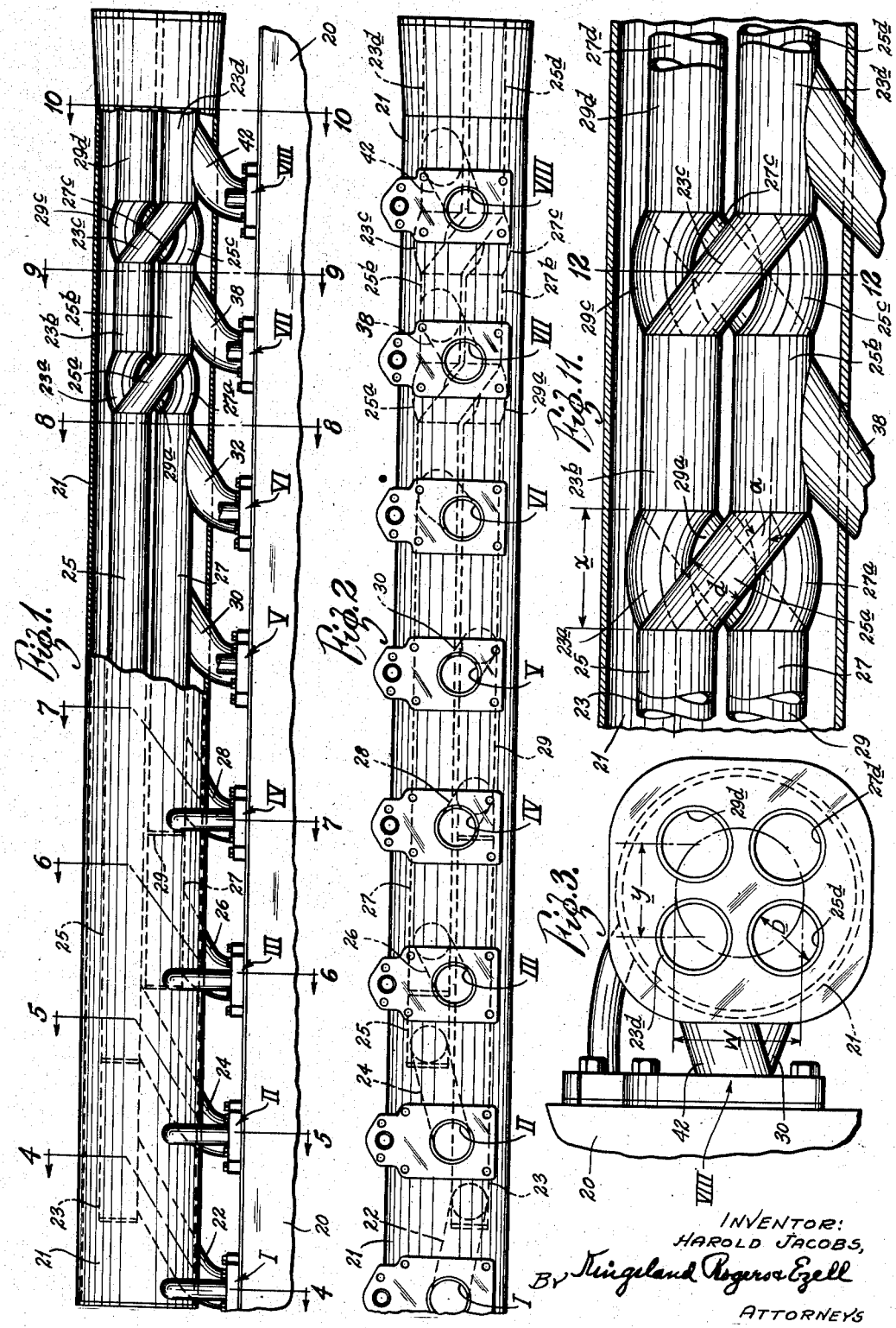

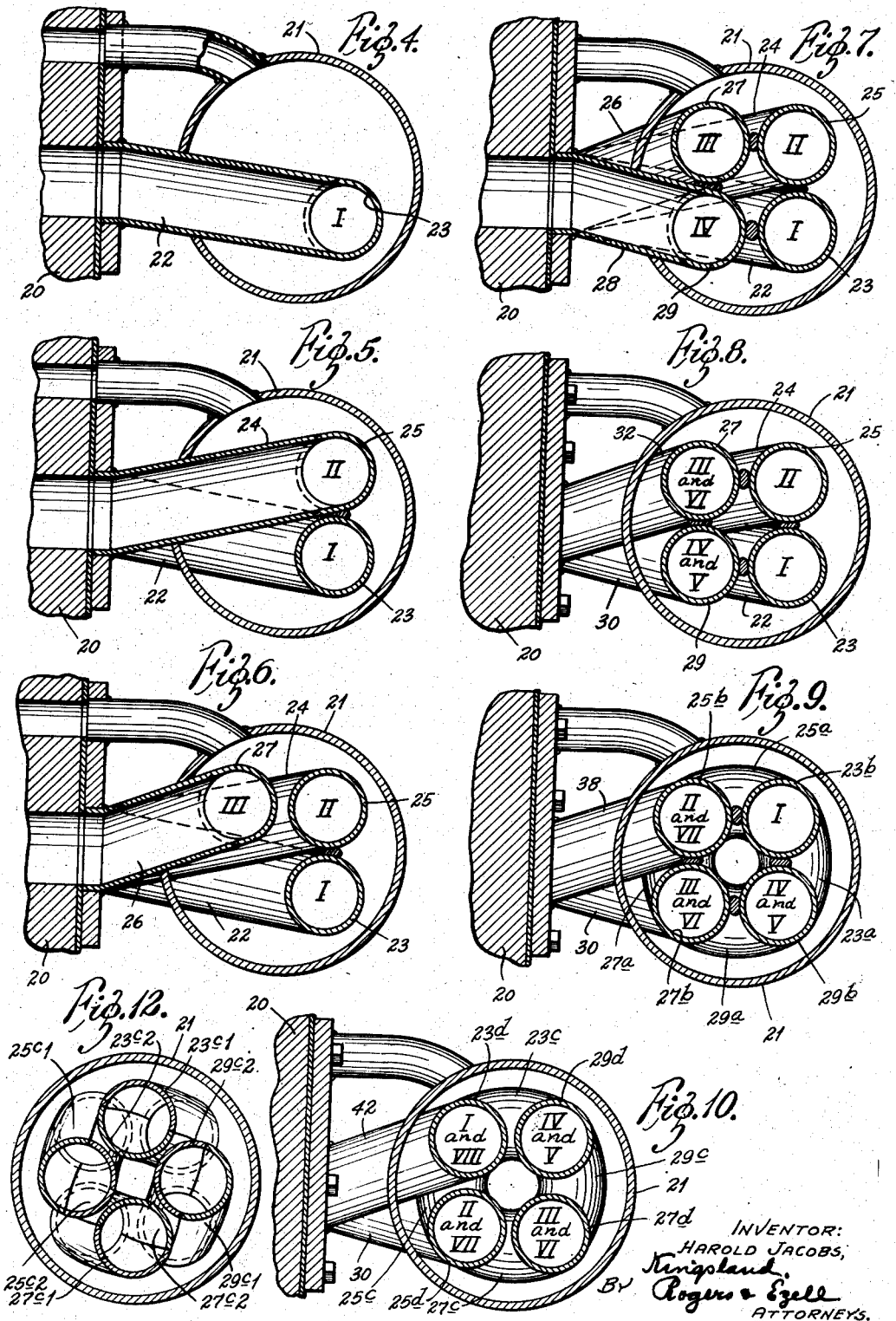

Patented May 18, 1954

2,678,530

UNITED STATES PATENT OFFICE 2,678,530

EXHAUST MANIFOLD, PARTICULARLY FOR TURBO CHARGING

Harold Jacobs, Clayton, Mo.

Application May 8, 1947, Serial No. 746,821

28 Claims. (Cl. 60—29)

The present invention relates to an exhaust manifold, particularly for turbo charging.

It is an object of this invention to provide an exhaust manifold of the foregoing kind for use with multiple cylinder engines having a plurality of exhaust ports that are arranged substantially in a line and in the same place, wherein the space occupied by the exhaust manifolding system is at a practical minimum and wherein the shape is as trim as possible. A further object is to provide a manifold of the foregoing kind that maintains as straight a flow of exhaust gas as is possible, with all directional change of flow within as small an angle as possible.

A further object of this invention is to attain the foregoing objects with a manifold using round tubing throughout. It is a further object of the invention to provide a manifolding of this kind having a rotator design that allows the piping of the various manifolds to connect with the proper cylinder exhaust and to "rotate" (i. e., twist) out of the way of other manifold elements that are required to connect to other cylinders for receiving their exhausts in the specified order.

A further object is to provide a rotator design wherein all of the tubes rotate at the same time, bringing whatever tube is required for a specified cylinder into line therewith. A further object is to accomplish the foregoing while maintaining a proper spacing between the various manifold elements, so that efficient cooling may be accomplished. A further object is to provide a manifolding of this kind that is capable of use with a jacket of continuous shape throughout the manifolding, and one as compact as possible, and more particularly to permit the use of tubular jacketing.

More particularly, an object of the invention is to provide a rotator for introducing the proper manifold element to its proper cylinder, in such wise as to cause the least amount of flow disturbance of the exhaust gases. And, particularly, it is an object to provide a manifolding that keeps the angles as small as possible and usually 30° or less to the primary line of flow of the exhaust gases. A further object is to provide a rotator that is made up of tubular elements having radii at least substantially as large as those of the manifold itself, and particularly a manifold having the radii actually as large as those of the manifold.

A further object is to provide a manifolding of this kind that employs standard parts to a maximum extent, such as standard tubing, standard jacket tubing, regular steel plate for flanges, welded fittings, conventional expansion joints, and the like. A further object is to produce a structure that has a minimum of welding and cutting and other fabricating procedures, but nevertheless is stronger and more efficient than manifolding of this type heretofore used.

A further object is to provide a manifolding capable of use with water cooling as well as with dry insulation.

A further object is to provide a manifolding including rotation so designed that expansion of the manifold may be accommodated by the rotating parts. Particularly, it is an object to provide rotating parts that curve so as to form bowed sections that can accommodate longitudinal expansion of the manifolding, with or without construction of the rotating parts of different thickness, or different material, so as to yield locally to expansion without breaking and without loss of strength.

A further object is to provide a manifolding that may be placed in whatever position is required by the engine builder, whether in line with the exhaust ports or not.

In the drawings:

Fig. 1 is a plan view, partly broken away, of a manifolding of the present type applied to an eight-cylinder engine;

Fig. 2 is an elevation of the manifolding shown in Fig. 1, taken from the bottom of Fig. 1;

Fig. 3 is an end view of the manifolding taken from the right ends of Figs. 1 and 2;

Figs. 4 through 10 are transverse sections along the manifold section approximately on the lines 4—4 through 10—10 of Fig. 1;

Fig. 11 is an enlarged view of the manifold including the rotators appearing at the right of Fig. 1;

Fig. 12 is a section on the line 12—12 of Fig. 11;

Fig. 13 is a diagrammatical view of an end section of the manifold;

Fig. 14 is a diagrammatical side elevation of one rotator element;

Fig. 15 is a diagrammatical projection of a rotator element to show it in true arc; and Fig. 16 is a diagrammatical view of a rotator in helical form.

This manifolding is here shown as applied to an eight-cylinder engine, which is diagrammatically indicated at 20. It may be employed on engines with a different number of cylinders, if desired, by adapting the principles hereof to the known arrangement for manifolding engines of various numbers of cylinders. The engine illustrated has eight exhaust ports that may be indicated by their cylinder numbers I through VIII, as shown. This engine is adapted to be used with such a system of turbo charging, as, for example, the Buchi system, that is applicable to four-cycle diesel engines, for example. Such turbo chargers are operated by exhaust gas from the engine, and they, in turn, operate centrifugal blowers to supply all of the air required by the engine, under pressure, through the conventional air intake manifold. This method employs the creation of timed pressure pulsations in the exhaust gas manifolds, accomplished by the timing of the inlet and exhaust valves and the proper combinations and dimensions of exhaust manifolds and turbine nozzles. There is a slight change in the valve timing of a turbo charged engine from that of the same engine unsupercharged, in that the inlet valves open earlier and the exhaust valves close later, providing a greater period of valve overlay during which time both inlet and exhaust valves remain open while the piston is near top dead-center.

In order to prevent interference between gas impulses, and to prevent blowing exhaust gas into one cylinder, during its scavenging period, from another cylinder likewise exhausting, separate manifold elements from one, two or three cylinders are connected to separated banks of nozzles in the turbine. In other words, there are a plurality of manifold elements, each of which is connected with selected cylinders. In the engine shown, which is an eight-cylinder engine, there are four manifold elements.

The exhaust connections for the several cylinders of the engine illustrated provide that cylinders I and VIII are connected into one manifold element, cylinders II and VII into another, cylinders III and VI into a third, and cylinders IV and V into a fourth manifold element. These four manifold elements may all, in the present arrangement, be enclosed within a casing jacket 21, which may be circular. As appears in the drawings, such as Fig. 7, there are two upper and two lower manifold elements, or, viewed differently, two outer and two inner elements. This clustering of the manifolds about a common center line is most desirable, particularly with respect to jacketing and simplicity of construction.

Cylinder I is connected by a short branch 22 into a manifold element 23, which is the lower, outer manifold in the left end of this arrangement.

To the right (Figs. 1, 2) of the short branch 22, a short branch 24 connects from the exhaust port of cylinder No. II to another manifold element 25 that is located immediately above the manifold element 23, and thereby at this point of connection constitutes the upper and outer of the four manifold elements.

Next in order is cylinder No. III, which is connected by a short branch 26 with a manifold element 27 (Fig. 6). This manifold element 27 at this point is the upper and inner of the four.

Next to the right of cylinder No. III is cylinder No. IV. Its exhaust port is connected by a short branch 28 with a manifold element 29, which at this position is the lower, inner manifold element.

Reference to Fig. 7 will show that, at the section line 7—7, the four manifold elements are clustered as indicated, with cylinder No. I connected to the lower, outer element, cylinder No. II connected to the upper, outer element, cylinder No. III connected to the inner, upper element, and cylinder No. IV connected to the inner, lower element.

As already predicted, cylinder No. V connects to the same manifold element that is connected with cylinder No. IV. At the position of the exhaust port for cylinder No. V, the manifold 29, which is connected to cylinder No. IV, is the lower, inner manifold element, and cylinder No. V may be connected directly thereto by a short branch 30.

Next along is cylinder No. VI, which must be connected with the manifold connected to cylinder No. III. A reference to Fig. 7 will show that cylinder No. III is connected to the inner, upper manifold 27, which thereby is immediately accessible for connection with cylinder No. VI by a short branch 32. It is most economical to put manifold pipes 27 and 29 initially on the inside, next to the engine, as these are the first to be connected to second cylinders, where the firing arrangement is as in a conventional eight-cylinder engine of this type.

Thus, at the section 8—8 in Fig. 8, it may be seen that cylinders III and VI are connected into the upper, inner manifold element 27, and cylinders IV and V are connected into the lower, inner manifold element 29. However, further reference to this view will show that the manifold elements 23 and 25, being back of, or outside, the manifold elements 27 and 29, are not accessible to cylinders VII and VIII with which they must be connected. To accomplish the repositioning of the manifolds for interconnection with cylinders VII and VIII, this invention contemplates the interposition of what may be called a rotator, which is a set of tubing that may be fabricated in a manner hereafter to be described, with one tube for each of the four manifold ducts 23, 25, 27 and 29, all of which tubes twist 90°, so that each manifold duct is shifted or rotated 90° about a central axis that happens to be at the center of the casing tube 21, without increasing to any substantial degree the maximum outer dimensions of the manifold unit. This rotator is preferably made as an element separate from the tubing, because then the tubing may be made of conventional materials of any length desired, and the rotators may be separately made and fabricated without the difficulties of fabrication when the long tubing is attached thereto. Then the rotator may be welded to the manifold elements.

The rotator tubes may all be identical and shaped preferably in accordance with an arrangement described later. As cylinder No. VII is the one next to be connected into the manifold after those already described, and as it requires connection into the duct that connects with cylinder No. II, it is necessary to bring the duct 25 into position to connect with cylinder No. VII. In the initial relationship shown in Fig. 8, this manifold 25 is the upper, outer one, and is not immediately accessible to the cylinder No. VII. However, reference to Figs. 1, 8 and 9 will show that the rotator between the section of Fig. 8 and the section of Fig. 9 twists the manifold grouping 90° around the central axis of this grouping. To this end, the rotator includes a section 25a that is attached to and forms a continuation of the manifold element 25. This section 25a twists the manifold duct 25 from the position at the upper rear of the group to the position of the inner, upper position, as shown in Fig. 9. The section 25a terminates in a straight section 25b that is connected by a short branch 38 with the exhaust cylinder No. VII. As shown in Fig. 16, and as later described, the section 25a may continuously twist through 180°, eliminating the straight section 25b, and having the short branch 38 connected into the twisting part.

It is correspondingly necessary to rotate all of the manifold elements when one is rotated. As a result of this necessity, Fig. 8 shows that the manifold 23 for cylinder No. I is connected with a rotator section 23a that rotates from the outer, lower position to the outer, upper position, whence it connects to a straight section 23b. The manifold element 27 is connected by a rotator section 27a in Fig. 9 that rotates to the inner, lower position and connects into a straight section 27b. The manifold element 29 is connected by a rotator section to the outer, lower position, as shown at 29a. The latter is connected to a straight section 29b. Withdrawal of the duct 29 from the inner side is permissible because the manifold element 29 has already been connected with both of the two cylinders 4 and 5, for which it acts as exhaust.

The foregoing provides for connection of the manifold duct 25 with cylinder No. VII, but it does not accommodate cylinder No. VIII, as the continuation 23b of the manifold 23 is not in a position on the inner side where it may connect with cylinder No. VIII. Consequently, between the section 9—9 of Fig. 1 and the section 10—10 thereof, illustrated in Figs. 9 and 10, it is necessary to rotate the manifold elements an additional 90° in order to bring the manifold element 23a to the inner position. This may be done conveniently and preferably by employing an additional rotator. As already suggested, and as will be described more fully, the rotators may all twist the full 180° continuously, as an alternative to this construction.

Reference to Fig. 1 and Figs. 9 and 10 will show that the manifold element 23 is moved in two stages from a lower, outer position to an inner, upper position. This is accomplished by a rotating section 23c connected with the straight section 23b, and leading to a straight section 23d in the inner, upper position wherein it may be connected by a branch 42 with the cylinder 8.

Similarly, all of the other elements of the manifold are again twisted 90°, by rotating sections 25c, 27c and 29c that respectively connect from sections 25b, 27b and 29b to straight sections 25d, 27d and 29d. This finally disposes the manifold duct 23 at the inner, upper position, the duct 25 at the lower one, the duct 27 at the outer, lower position, and the duct 29 at the outer, upper one.

The rotator thus may consist of two initially separate 90° twisting sections, which are identical in construction. This is the preferable construction, as it employs standard parts with simple connections. It will be understood, however, that it may be varied, within the scope of this invention. One alternative is that of Fig. 16.

The construction of the rotators must accommodate predetermined conditions. In the first place, the cross-sectional area of each rotator element must be sufficient to meet the requirements prescribed by its use with a turbo-charger. The directional change in the gas stream must not be so abrupt as to cause turbulence. The maximum outside diameter of the rotator must not be substantially greater than the maximum outside diameter of the group of manifold elements, in order to use a small jacket, and preferably so that a stock, round jacket may fit.

Also, all of the rotator elements must interfit as they rotate. The rotation must be accomplished within a short enough longitudinal distance to permit connections of successive exhaust ports of a given engine in the rotator.

To illustrate a particularly desired form of rotator, the following description is given. This description is related to a four-manifold grouping, as this grouping usually appears in engines having four cylinders, or multiples thereof. However, its principles, as will be evident, are applicable to other groupings with the changes in the trigonometry of the formulae that are obvious.

Fig. 13 shows diagrammatically an end view of the pipe group. Fig. 14 is a side elevation of one of the rotator elements; and Fig. 15 is a bottom view of the element of Fig. 14, taken at the proper angle to show its true arc. This latter view illustrates that the pipe is a true arc, of proportions to be described, and capable of being disposed between the pipes to be connected in such wise as to attain the desired objectives.

The indicia on these figures have the following meanings:

$x$ = the projected distance through which the rotation occurs measured along the axis of the manifolding.
$y$ = the straight line distance between the centers of adjacent manifold ducts.
$D$ = the external diameter of the manifold ducts.
$d$ = the external diameter of the rotator element.
$W$ = the diameter of the rotation and the diameter between alternate duct centers.
$R$ = the true radius of the rotator elements on the center line.
$m$ = the arc height.
$C$ = the true chord length of the rotator on center line.
$\alpha$ = the angle of inclination of rotator element, projected.
$B$ = degree of rotator bend on center line.

Of the foregoing factors, $D$, $d$, $x$ and $y$ contain the knowns that are supplied by the engine designer. Three of the four are always known, and from them the fourth may be derived.

It will be noted that $$\cos \alpha = \frac{d}{D}$$

and that $$\tan \alpha = \frac{y}{x}$$

Stated differently $$\frac{y}{\sqrt{x^2+y^2}} = \frac{\sqrt{D^2-d^2}}{D}$$

and $$\frac{yd}{\sqrt{D^2-d^2}} = \sqrt{x^2+y^2}$$

and $$\frac{y^2 D^2}{D^2-d^2} = x^2+y^2$$

$$x^2 = \frac{y^2 D^2}{D^2-d^2} - y^2 = \frac{y^2(D^2-d^2)-y^2 D^2}{D^2-d^2} = \frac{y^2 d^2}{D^2-d^2}$$

and hence (1) $$x = \frac{yd}{\sqrt{D^2-d^2}} = \frac{yd}{\sqrt{(D+d)(D-d)}}$$

(2) $$y = \frac{x\sqrt{D^2-d^2}}{d} = \frac{x\sqrt{(D+d)(D-d)}}{d}$$

(3) $$d = \frac{xD}{\sqrt{x^2+y^2}}$$

(4) $$D = \frac{d\sqrt{x^2+y^2}}{D}$$

(5) $$C = \sqrt{x^2+y^2}$$

Also, by application of geometry:

(6) $$m = .2071y = \frac{W-y}{2}$$

(7) $$W = 1.4142y$$

(8) $$R = \frac{2y^2 + x^2}{1.568y}$$

(9) $$\sin\frac{B}{2} = \frac{.8284y\sqrt{x^2+y^2}}{2y^2+x^2}$$

(10) $$A = R.017453\ B°$$

The fixing of $m$ is based upon the requirement that the outer diametrical limit of the rotator shall not exceed the outer limit of the duct group. This length is approximate, as small variations will still permit the rotator to be jacketed within a tubular jacket that will accommodate the ducts themselves.

Usually the known factors will be D, $x$ and $y$. D is determined by engine characteristics, as is $x$, though $x$ is subject to some flexibility as previously described. From D, $x$ and $y$, determination of $d$ as the size for the rotator pipe is obtained from (3).

Where $d$ is fixed, along with D and $y$, then $x$ may be determined from (1). This may determine whether the short straight sections like 25b are used or not. Also, if $x$, D and $d$ are fixed, the dimension for $y$ may be found from (2).

When $m$ and C are known or derived from the formulae (as in terms of $x$ and $y$), R is fixed, for $m$ represents a perpendicular bisector of C, and the three extreme points of C and $m$ thus disposed fix the true arc and hence R. A gives the factor from which the necessary length of pipe is found.

From the foregoing, it may be seen that each rotator element is a true arc, the radius of which can be found. In describing the center line of the rotator, the radius swings in a plane at the angle to the longitudinal axis of the manifold.

Normally, as noted, the rotator elements will have mitre cut ends whereby they interfit with complementary mitre cut ends on the ducts. This is subject to the modifications of convenience, and the junctions of the rotator elements and ducts may be rounded by suitable arrangement, as, for example, heating and shaping, or using commercial fittings to insure a smooth rounded joint.

The foregoing rotator bows outwardly from the axis of the manifold as it twists. This has an advantage in providing for expansion in the manifolding, along the manifold axis. The bowed sections may yield in a direction to increase or decrease the curvature in response to change in length of the manifolding, thereby accommodating such changes. This capacity to absorb expansion and contraction can be enhanced by employing a relatively flexible material such as stainless steel or copper for the rotator, or by employing tubing of reduced wall thickness therefor, or of course both the different material and the reduced length.

Where the outer diameter of the rotator ducts must be reduced, the wall thickness must be reduced to maintain an inside diameter the same as that of the ducts themselves. This may require the use of stronger material such as stainless steel or the like, in order to maintain the strength. Thus the use of stronger and more flexible material in the rotator has multiple advantages.

It should be apparent how the principles of this preferred design could be applied to manifold groupings of other than four ducts. The result is a rotator that properly disposes the ducts for the required connections, and yet attains the other objectives hereof.

In fabricating such a construction as this, it is usually preferable to weld the rotator sections to the ducts, rather than to form the ducts into the rotator sections. The present rotator can be so welded by employing the following method.

Consideration of Figs. 1 and 7 will show that it is extremely difficult if not impossible to weld seams around each pipe in a fixed group of the kind illustrated, owing to the fact that the four ducts form an enclosure rendering their surfaces inside the cluster inaccessible to welding tools. To overcome this, the rotator elements are made separate by longitudinal division of each into half tubes. These are indicated in Fig. 12 at $23c^1$ for an outer half and $23c^2$ for an inner half, with the other elements similarly formed. All of the inner halves, with or without being welded to each other, are welded at their ends to their proper ducts, such as 23b and 23d. As the half tubes of the rotator are open, these seams may be made from the inside. Then the several outer half tubes, as $23c^1$, may be welded to their inner half tubes and to their ducts by external weld seams. The final product is thus produced. It may be obvious that some of the elements may be full round and welded into place by extreme welds, leaving out enough elements to give access to the full round ones on their inner sides. The gap may then be closed by a sectional element or elements as aforesaid.

While the foregoing arcuate rotator element construction is deemed most desirable, it will be understood that in many cases, where facile determination of all characteristics of the complete duct is not required, modifications may be made. And where price factors and fabrication simplicity are less to be considered the pipes may be twisted into a helical arrangement. One such rotator element appears in Fig. 16, whereon reference numbers used on the preferred arrangement are applied to like parts. However, while the helical arrangement is an improvement over the prior art, the preferred construction has numerous advantages. One of these is its superior capacity to absorb expansion of the ducts, by virtue of its being bowed. And, particularly, where less abrupt change in direction of gas flow is essential, the rotation may be increased to extend over a longer distance along the manifold. The final limitation on the extension of the rotator lies in the spacing of the cylinders, and the requirement that the rotation not begin so far to the left in Fig. 1 that the short connector 30 for the cylinder V not be attached to the duct 29 while it is on the inner side, and unobstructed by the interposition of another duct being rotated; and it must dispose the ducts 23 and 25 onto the inner side for connection with the cylinders VII and VIII. As already noted, the connections for the short sections connecting to the exhaust ports are made more complex when they have to be fitted into a rotating pipe section.

What is claimed is:

1. In a manifold for internal combustion engines having a plurality of cylinders, a plurality of substantially straight ducts grouped about a manifold axis, for disposition alongside the engine, each being an individual conduit, at least one duct being remote from the engine side of the group and separated therefrom by another of the group, and a rotator portion comprising rotator elements forming continuations of all of the ducts, said rotator elements comprising curved pipes that extend lengthwise of the manifold and also are twisted about the manifold axis, the remote duct being twisted from its separated position to a position on the engine side of the group, and another duct being twisted from the engine side of the group to the remote side, and each duct having a pair of inlets on the engine side, and open to the engine side unobstructed by another duct.

2. In a manifold for internal combustion engines having a plurality of cylinders, a plurality of substantially straight ducts grouped about a manifold axis, for disposition alongside the engine, each being an individual conduit, at least one duct being remote from the engine side of the group and separated therefrom by another of the group, and a rotator portion comprising rotator elements forming continuations of all of the ducts, said rotator elements comprising curved pipes that extend lengthwise of the manifold and also are twisted about the manifold axis, the remote duct being twisted from its separated position to a position on the engine side of the group, and another duct being twisted from the engine side of the group to the remote side, said rotator elements being twisted so that each has a smooth curve from end to end, and each duct having a pair of inlets on the engine side, open to that side unobstructed by another duct; the rotator elements having an extent along the axis of the manifold substantially equal to the distance between two successive inlets.

3. In a manifold for internal combustion engines having a plurality of cylinders, a plurality of ducts grouped about a manifold axis, for disposition alongside the engine, each being an individual conduit, at least one duct being remote from the engine side of the group and separated therefrom by another of the group, and a rotator portion comprising rotator elements forming continuations of all of the ducts, said rotator elements comprising curved pipes that extend lengthwise of the manifold and are at the same time twisted about the manifold axis, the remote duct being twisted from its separated position to a position on the engine side of the group, and another duct being twisted from the engine side of the group to the remote side, said rotator elements being bowed as they are twisted, and being flexible relative to the ducts, so as to absorb longitudinal expansion of the ducts, each duct having a pair of inlets on the engine side open to that side unobstructed by another duct.

4. In a manifold for internal combustion engines having a plurality of cylinders, a plurality of ducts grouped about a manifold axis, for disposition alongside the engine, each being an individual conduit, at least one duct being remote from the engine side of the group and separated therefrom by another of the group, and a rotator portion comprising rotator elements forming continuations of all of the ducts, said rotator elements comprising curved pipes that extend lengthwise of the manifold and are at the same time twisted about the manifold axis, the remote duct being twisted from its separated position to a position on the engine side of the group, and another duct being twisted from the engine side of the group to the remote side, said rotator elements being constructed of material different from and more flexible than the material of the ducts, whereby expansion in the ducts may be accommodated for within the rotator, each duct having a pair of inlets on the engine side open to that side unobstructed by another duct.

5. A manifold for use with an engine having at least six cylinders arranged in line, comprising a plurality of pipes with a separate pipe for each of two cylinders, the pipes being arranged in a cluster about a central axis, so that at least one remote pipe is separated from the engine by an intervening adjacent pipe, each remote pipe extending at one end of the manifold beyond the adjacent pipes for receiving engine connecting means across the ends of said adjacent pipes, and the adjacent pipes having means for connection with the engine, said connections aforesaid providing connections for the first half of the cylinders of the engine, the adjacent pipes extending beyond the first half of the cylinders and having additional means for connection with cylinders of said second half of the engine, and beyond said connections, all pipes having portions twisted about the central axis so as to displace each remote pipe to an adjacent position and to displace each adjacent pipe to a remote position, said twisted portions extending axially of the manifold as they twist and being smoothly curved so as to avoid abrupt bends that would obstruct flow, and means for connecting each remote pipe thus displaced to an adjacent position, with cylinders of said second half of the engine.

6. A manifold for use with an engine having at least six cylinders arranged in line, comprising a plurality of pipes with a separate pipe for each two cylinders, the pipes being arranged in a cluster about a central axis, so that at least one remote pipe is separated from the engine by an intervening adjacent pipe, each remote pipe extending at one end of the manifold beyond the adjacent pipes for receiving engine connecting means across the ends of said adjacent pipes, and the adjacent pipes having means for connection with the engine, said connections aforesaid providing connections for the first half of the cylinders of the engine, the adjacent pipes extending beyond the first half of the cylinders and having additional means for connection with cylinders of said second half of the engine, and beyond said connections, all pipes having portions twisted about the central axis so as to displace each remote pipe to an adjacent position and to displace each adjacent pipe to a remote position, said twisted portions extending axially of the manifold as they twist and being smoothly curved so as to avoid abrupt bends that would obstruct flow, and means for connecting each remote pipe thus displaced to an adjacent position, with cylinders of said second half of the engine, and a cylindrical jacket around said pipes.

7. A manifold comprising a plurality of substantially straight individual ducts grouped about a longitudinal manifold axis, a plurality of substantially straight continuation ducts grouped similarly but rotated about the manifold axis relatively to the first group, and a rotator having rotator elements, one for connecting each manifold duct with its continuation duct, each rotator element comprising an arcuate pipe, the arcuate pipes being grouped around the manifold axis, and with their convex portions outwardly of the axis, whereby they interfit.

8. A manifold comprising a plurality of individual ducts grouped about a longitudinal manifold axis, a plurality of continuation ducts grouped similarly but rotated about the manifold axis relatively to the first group, and a rotator having rotator elements, one for connecting each manifold duct with its continuation duct, each rotator element comprising an arcuate pipe, the arcuate pipe being so disposed that its radius occupies a plane intersected by the center lines of the duct and continuation duct and perpendicular to the plane of the two center lines, the arcuate pipes being grouped around the manifold axis, and with their convex portions outwardly of the axis, whereby they interfit.

9. A manifold comprising a plurality of individual ducts grouped about a longitudinal manifold axis, a plurality of continuation ducts grouped similarly but rotated about the manifold axis relatively to the first group, and a rotator having rotator elements, one for connecting each manifold duct with its continuation duct, each rotator element comprising an arcuate pipe, the arc of the pipe being such that the outer diameter of each rotator element extends out not substantially further than the outer diameter of its ducts, measured from the longitudinal manifold axis, the arcuate pipes being grouped around the manifold axis, and with their convex portions outwardly of the axis, whereby they interfit.

10. A manifold comprising a plurality of ducts grouped about a longitudinal manifold axis, a plurality of continuation ducts grouped similarly but rotated about the manifold axis relatively to the first group, and a rotator having rotator elements, one for connecting each manifold duct with its continuation duct, each rotator element comprising an arcuate pipe, the arcuate pipe being so disposed that its radius occupies a plane intersected by the center lines of the duct and continuation duct and perpendicular to the plane of the two center lines, the center line of the arcuate pipe comprising an arc having two points at the ends of the center lines of the duct and the continuation duct, and an intermediate point on a perpendicular bisector of a line joining said two points and outwardly from said line not substantially further than the difference between distance from the longitudinal manifold axis to said duct center lines and one-half the distance between duct center lines.

11. In a rotator for an engine manifold having a plurality of pipes disposed about a manifold axis, the combination of a plurality of rotator elements having a configuration to twist from an inlet end to an outlet end about the manifold axis, at least one of the elements comprising two longitudinally divided sections divided so as to provide an inner section disposed toward the manifold axis welded into place by an internal weld, and an outer section separated from the manifold axis by the inner section, welded into place and welded to the inner section by an external weld.

12. A manifold for an engine having more than four cylinders, comprising a plurality of separate pipes forming ducts arranged in a cluster about a manifold axis, the ducts having straight, parallel axes for a first part of their lengths, and an inlet for connection with the engine into the ducts adjacent the engine, and a rotator means in the ducts at the end of said first part twisting all ducts about the manifold axis, bringing at least one duct that was remote from the engine side of the manifold to adjacent the same, and correspondingly displacing a duct that was adjacent the engine side, to be remote from the engine side.

13. A manifold for an engine having more than four cylinders, comprising a plurality of separate pipes forming ducts arranged in a cluster about a manifold axis, the ducts having straight, parallel axes for a first part of their lengths, and an inlet for connection with the engine into the ducts adjacent the engine, and a rotator means in the ducts at the end of said first part twisting all ducts about the manifold axis, bringing at least one duct that was remote from the engine side of the manifold to adjacent the same, and correspondingly displacing a duct that was adjacent the engine side, to be remote from the engine side, and the ducts continuing beyond said rotator means with parallel straight axes.

14. A manifold for an engine having more than four cylinders, comprising a cluster of separate pipes forming ducts arranged about a manifold axis with one duct for each two cylinders, and with a duct for every cylinder, half of the ducts, and at least two ducts, being disposed on the engine side of the manifold axis, and the remainder being on the remote side, the ducts having parallel, straight axes for their first portion lengthwise, the remote ducts being longer at the first end of said portion than the engine side ducts, and having inlet means toward their own engine sides, the engine side ducts thereafter having inlet means on their engine sides, the manifold ducts being all twisted about the manifold axis at the other end of said portion to present successively each remote duct to the engine side, whereat it has an inlet for connection with the engine.

15. A manifold for an engine having more than four cylinders, comprising a cluster of separate pipes forming ducts arranged about a manifold axis with one duct for each two cylinders, and with a duct for every cylinder, half of the ducts, and at least two ducts, being disposed on the engine side of the manifold axis, and the remainder being on the remote side, the ducts having parallel, straight axes for their first portion lengthwise, the remote ducts being longer at the first end of said portion than the engine side ducts, and having inlet means toward their own engine sides, the engine side ducts thereafter having inlet means on their engine sides, the manifold ducts being all twisted about the manifold axis at the other end of said portion to present successively each remote duct to the engine side, whereat it has an inlet for connection with the engine, there being a section after each twist presenting another remote duct to the engine side, in which section the ducts have parallel straight axes.

16. In a manifold for disposition alongside a row of at least six cylinders of an engine and to have a plurality of separate conduits, each conduit being connectible with two of said cylinders, the manifold being closed at one end and open at the other so that connections can be made with the conduits; the combination of a first set of a plurality of separate pipes arranged in a group about, and extending along, a common axis, there being at least three pipes so that at least one pipe is an outside pipe separated from the engine side of the manifold by the inside pipes on the engine side of the manifold; the outside pipes being longer at the closed end of the manifold than the inside pipes; branches from each pipe extending directly inward toward the cylinders for connection therewith, the projection of the outside pipes beyond the inside pipes providing for the said branches from such outside pipes without interference from the inside pipes; a second set of pipes corresponding in number to the first set and similarly spaced with respect to each other, around the manifold axis, but with each pipe corresponding to one pipe of the first set, being displaced angularly around the manifold axis, and longitudinally along said axis, from such corresponding pipe of the first set; rotating means between said two sets of pipes, including a group of curved, separate, connecting pipes, one interconnecting each pipe of the first set with its corresponding pipe of the second set, said curved pipes interfitting together without interference, and having enough angular displacement to dispose the outside pipes on the inside; and second branches leading from the pipes thus rotated from the outside to the inside.

17. The combination of claim 16, wherein the curved pipes of the rotating means are arcuate.

18. In a manifold for disposition alongside a row of at least six cylinders of an engine and to have a plurality of separate conduits, each conduit being connectible with two of said cylinders, the manifold being closed at one end and open at the other so that connections can be made with the conduits; the combination of a first set of a plurality of separate pipes arranged in a group about, and extending along, a common axis, there being at least three pipes so that at least one pipe is an outside pipe separated from the engine side of the manifold by the inside pipes on the engine side of the manifold; branches for connection with the engine cylinders, the branches extending from the inside of the several pipes directly toward the engine; a second set of pipes corresponding in number to the first set and similarly spaced with respect to each other, around the manifold axis, but with each pipe corresponding to one pipe of the first set, being displaced angularly around the manifold axis, and longitudinally along said axis, from such corresponding pipe of the first set; rotating means between said two sets of pipes, including a group of curved, separate, connecting pipes, one interconnecting each pipe of the first set with its corresponding pipe of the second set, said curved pipes interfitting together without interference, and having enough angular displacement to dispose the outside pipes on the inside; and second branches leading from the pipes thus rotated from the outside to the inside, the rotator pipes being arcuate and the radii from midway along each one extending down through the manifold axis.

19. In a manifold for disposition alongside a row of at least six cylinders of an engine and to have a plurality of separate conduits, each conduit being connectible with two of said cylinders, the manifold being closed at one end and open at the other so that connections can be made with the conduits; the combination of a first set of a plurality of separate pipes arranged in a group about, and extending along, a common axis, there being at least three pipes so that at least one pipe is an outside pipe separated from the engine side of the manifold by the inside pipes on the engine side of the manifold; branches for connection with the engine cylinders, the branches extending from the inside of the several pipes directly toward the engine; a second set of pipes corresponding in number to the first set and similarly spaced with respect to each other, around the manifold axis, but with each pipe corresponding to one pipe of the first set, being displaced angularly around the manifold axis, and longitudinally along said axis, from such corresponding pipe of the first set; rotating means between said two sets of pipes, including a group of curved, separate, connecting pipes, one interconnecting each pipe of the first set with its corresponding pipe of the second set, said curved pipes interfitting together without interference, and having enough angular displacement to dispose the outside pipes on the inside; and second branches leading from the pipes thus rotated from the outside to the inside, together with a second like rotating means rotating the pipes a second time, and another set of branches after said second rotation.

20. In combination two straight, parallel, longitudinally spaced and laterally displaced pipes, a connection between them, including a plurality of curved pipe sections, the curved axes of which occupy planes, the planes in which the curved axes of two of the curved pipe sections lie being at an angle to one another to provide a dual lateral displacement for the pipes.

21. In an exhaust header for internal combustion engines and the like, a housing, a plurality of exhaust pipes side by side, grouped about the longitudinal axis thereof and enclosed therein, each pipe including two straight parallel sections, relatively angularly spaced about the longitudinal axis, each section being joined to its opposed section by a curved pipe within the housing, each curved pipe being outwardly displaced with respect to the straight pipes and out of contact with the other curved pipes.

22. In an exhaust header for internal combustion engines and the like, a plurality of exhaust pipes extending side by side and grouped about a common longitudinal axis, each pipe including two straight generally parallel sections relatively angularly spaced about said axis, the straight sections of each pipe being joined to each other by a curved pipe section, said pipes being out of contact with each other throughout a substantial portion of their lengths.

23. In an exhaust header for internal combustion engines and the like, a housing, a plurality of exhaust pipes side by side, grouped about the longitudinal axis thereof and enclosed therein, each pipe including two straight parallel sections, relatively angularly spaced about the longitudinal axis, each section being joined to its opposed section by curved piping within the housing, each curved piping including a plurality of curved sections curved about a radius substantially longer than the pipe diameter, the curved axis of the successive curved sections lying in generally perpendicular planes.

24. In an exhaust header for internal combustion engines and the like, a plurality of generally straight parallel exhaust pipes grouped about a longitudinal axis, each pipe including at least two straight sections parallel with the axis, the sections being relatively angularly spaced about the axis, each section being joined to its opposed section by curved piping outwardly displaced with respect to the pipes, each pipe being spaced from and out of contact with the other, the curved pipes comprising at least two curved sections joined together in a single conduit, the curved axes of successive sections lying in intersecting planes.

25. In a manifold for disposition alongside a plurality of cylinders of an engine: a plurality of circular pipes arranged around a manifold axis, the pipes being disposed around the axis, and at least one pipe being on the outside of the axis with respect to the engine side of the manifold and separated by the other pipes from the engine side of the manifold; each pipe having at least two inlet connections extending toward the engine side of the manifold; the pipes being twisted about the manifold axis to enable all of the inlets to enter the pipes directly without interference from other pipes; a casing enclosing all the pipes, to provide for a cooling medium around the pipes, the casing having a head through which the pipes discharge; all of the pipes having their axes substantially the same from end to end so that the pipes may be fitted together within the casing around the manifold axis; and the pipes being out of contact with each other to enable the cooling medium to pass wholly around them.

26. A rotator for a manifold of the character in which the manifold has two groups of pipes that are both axially and angularly displaced from each other; the rotator comprising a rotating member having a plurality of pipe portions arranged around an axis, each curving angularly around the axis as it extends along the axis, whereby when inserted between manifold pipe groups as aforesaid, the corresponding pipes of the two groups may be joined; at least one of the pipe portions of the rotating member being divided into an inner open section joined to the remaining pipe portions, and a separate outer pipe section complementary to said inner open section, for being joined to said inner section to close the same.

27. The rotator of claim 26 wherein all of the pipe portions are thus divided into inner sections and outer sections.

28. The combination of claim 26 wherein the pipe portions are all curved in arcs, and are all of substantially the same length.

References Cited in the file of this patent

UNITED STATES PATENTS

| Number | Name | Date |
|---|---|---|
| 51,017 | Cate | Nov. 21, 1865 |
| 2,390,913 | Barrett | Dec. 11, 1945 |
| 2,423,574 | Barrett | July 8, 1947 |
| 2,423,602 | Magdeburger | July 8, 1947 |
| 2,444,644 | Füllemann | July 6, 1948 |
| 2,455,493 | Jacobs | Dec. 7, 1948 |
| 2,479,318 | Cramer, Jr. | Aug. 16, 1949 |

FOREIGN PATENTS

| Number | Country | Date |
|---|---|---|
| 138,682 | Switzerland | May 16, 1930 |
| 527,059 | Great Britain | Oct. 1, 1940 |